(12) United States Patent
Uematsu et al.

(10) Patent No.: US 6,367,242 B2
(45) Date of Patent: Apr. 9, 2002

(54) RECOVERY TYPE STEAM COOLED GAS TURBINE

(75) Inventors: Kazuo Uematsu; Katsunori Tanaka; Kazuharu Hirokawa, all of Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/197,604

(22) Filed: Nov. 23, 1998

(30) Foreign Application Priority Data

Nov. 26, 1997 (JP) .............................. 9-324565

(51) Int. Cl.$^7$ ................................ F02C 1/00
(52) U.S. Cl. ..................... 60/39.182; 60/39.3; 60/39.75
(58) Field of Search ............................. 60/39.3, 39.182, 60/39.75, 39.141

(56) References Cited

U.S. PATENT DOCUMENTS

| 5,253,976 A | 10/1993 | Cunha |
| 5,340,274 A | 8/1994 | Cunha |
| 5,579,631 A | * 12/1996 | Chen et al. ................ 60/39.05 |
| 5,829,245 A | * 11/1998 | McQuiggan et al. ....... 60/39.75 |

FOREIGN PATENT DOCUMENTS

| JP | 8-319852 | 12/1996 |
| JP | 9-88519 | 3/1997 |
| JP | 9-195798 | 7/1997 |
| JP | 9-209713 | 8/1997 |

* cited by examiner

Primary Examiner—Charles G. Freay
Assistant Examiner—Ehud Gartenberg
(74) Attorney, Agent, or Firm—Sughrue Mion, PLLC

(57) ABSTRACT

In a recovery type steam cooled gas turbine, dew condensation is prevented when feeding steam in a starting operation of the gas turbine, and penetration of high temperature combustion gas into a steam cooling passage is prevented. Also, residual steam is removed in the stopping operation of the gas turbine.

The gas turbine (1) has moving and stationary blade steam cooling passages (4a, 4b). The steam from steam cooling pipes (9, 10) flows through these passages to cool them. The steam after cooling is recovered. In the starting operation of the gas turbine, air from a compressor (2) flows through a valve (15) and a flow rate regulator (7). Also, a portion of the air is subjected to a temperature adjustment in a temperature adjuster (5) and flows through three-way valves (11, 12) to a steam cooling passage (4a, 4b) to be discharged through three-way valves (13, 14) and a flow rate regulator valve (8) to warm the passages (4a, 4b). Also, valves (15, 16) are closed and a valve (17) is opened so that outside air or inert gas from a medium feed source (6) may flow. After the warming up operation in the starting operation, the three-way valves (11 to 14) are switched to allow the steam to flow from the pipes (9, 10) to the passages (4a, 4b) to perform cooling during regular operation. Furthermore, after the stopping operation, it is possible to purge the residual steam within the passages (4a, 4b) with air.

8 Claims, 8 Drawing Sheets

RECOVERY TYPE STEAM COOLED GAS TURBINE

BACKGROUND OF THE INVENTION

1. Field of the Invention

The present invention relates to a recovery type steam cooled gas turbine, and more particularly to a recovery type steam cooled gas turbine for warming steam cooling passages of combustor walls, moving blades, stationary blades, a rotor or the like upon starting the gas turbine, for preventing dew formation when feeding the steam, and for preventing rust generated by the condensed steam during the stopping operation.

2. Description of the Related Art

Recently, the combustion temperature of combustion gas for gas turbine has been increasing in accordance with demands for higher efficiency in power generation plants. Consequently, high temperature exhaust gas from a gas turbine is introduced into a waste heat recovery boiler and the exhaust gas heats the boiler to generate steam. Moreover, a composite power generation plant driven by a steam turbine using this steam has been developed. In such a composite power generation plant, a steam cooling method with superior cooling performance has been proposed for cooling high temperature components of the gas turbine instead of using an air cooling method.

FIG. 8 shows one example of the above-described steam cooled type gas turbine, and in particular shows an operation method when starting. In FIG. 8, numeral 70 denotes the gas turbine, numerals 71-1, 71-2 and 71-3 denote stationary blades, numerals 72-1, 72-2 and 72-3 denote moving blades, and numeral 73 denotes a rotor of the gas turbine 70. Numerals 74, 75, 76 and 77 denote three-way valves, respectively. Numeral 80 denotes a steam feed pipe. Numeral 81 denotes an air feed pipe for introducing cooling air from a compressor (not shown) to the turbine blades. Numeral 82 denotes an air return pipe. Numerals 83 and 84 denote pipes for feeding the air or the steam cooling medium to the stationary blades 71-1 to 71-3, respectively, and recovering it (In FIG. 8, this is only shown for the stationary blade 71-1 and the others are omitted). Numerals 85 and 86 denote pipes for feeding the cooling medium to the moving blades 72-1 to 72-3, respectively, and recovering it. In the same manner, this is only shown for the moving blade 72-1 and the others are omitted. Numeral 87 denotes a pipe for connecting the three-way valves 77 and 75 to each other.

In the starting operation of thus constructed gas turbine, the three-way valve 77 is switched to close the steam feed pipe 80 side and open the air feed pipe 81 side to introduce the air from the compressor through the pipe 81 to the pipe 87. This air is used as the cooling air for cooling the turbine blades during regular operation, but is used for warming the passages within the turbine blades during the starting operation. Thereafter, the air passes through the pipe 83 via the three-way valve 75 and is introduced to and passed the stationary blades 71-1 to 71-3. Then, the air which has been passed out of the stationary blades passes through the pipe 84 and the three-way valve 74 and is recovered on the compressor side from the three-way valve 76 through the pipe 82. Also, at the same time, the air passes through the pipe 85 from the three-way valve 75 and is introduced into the moving blades 72-1 to 72-3 to be passed through the moving blades. The air that has been passed out of the moving blades passes through the pipe 86 and the three-way valve 74, to be recovered on the compressor side from the three-way valve 76 through the pipe 82.

When the stationary blades 71-1 to 71-3 and the moving blades 72-1 to 72-3 are warmed by the air from the compressor to a temperature that is suitable for the steam flow, the three-way valves 77 and 76 are switched to close the air feed pipes 81 and 82 and open the steam feed pipe 80 to feed steam to the gas turbine blades instead of the air from the compressor. Then, when the steam passes through the stationary blades 71-1 to 71-3 and the moving blades 72-1 to 72-3, the gas turbine enters normal operating conditions.

Thus, in the starting operation of the gas turbine, the cooling air from the compressor to be used as the cooling medium for cooling the high temperature components during regular operation is used for warming the flow passages within the gas turbine blades. When the temperature of the flow passages, i.e., the cooling medium flow passages, becomes, due to the air from the compressor, equal to or higher than a temperature at which dew is not formed when the steam flows, the three-way valve is switched to stop the flow of the cooling air and circulate the cooling steam.

Subsequently, FIG. 7 shows another example of a method for starting a gas turbine using a steam cooled system. In FIG. 7, a gas turbine system 101 is composed of a compressor 104, a combustor 106 coupled with the compressor 104 and a gas turbine 108 rotatably driven by the combustion gas. The compressor 104 and the gas turbine 108 are connected to each other through a single axis and are connected to the power generator 100a.

A steam turbine system 102 is composed of a waste heat recovery boiler 112 for introducing the waste gas from the gas turbine 108 through an exhaust gas passage 111, a steam turbine 114 rotatably driven by the steam fed from the boiler 112 through a steam passage 113b and a steam condenser 116 for converting back into water the waste steam (gas-liquid two-phase flow) of the steam turbine 114 introduced through a waste steam passage 115. The condensed water generated in the steam condenser 116 is circulated to the waste heat recovery boiler 112 through a condenser pump 117 and a condenser pipe 118. A power generator 100b is connected to the steam turbine 114. Regulator valves 119a and 119b and check valves 200a and 200b are provided in the steam passages 113a and 113b, respectively. Also, a regulator valve 121 is provided in the steam passage 115.

A cooling steam system 103 for cooling the gas turbine 108 is composed of a main system 122a and an auxiliary system 122b. The main system 122a is detoured so as to introduce a portion of one steam passage 113a to the stationary blades or moving blades which are the high temperature area 123 of the gas turbine 108 of a gas turbine system 101. The steam feed source is the waste heat recovery boiler 112.

In the auxiliary system 122b, the steam generating portion is connected to one steam passage 113a of the main system 122a by an auxiliary steam passage 127 having a check valve 125 and a regulator valve 126, so that the auxiliary steam is fed to the high temperature area 123 of the gas turbine 108. After cooling the high temperature area 123, the auxiliary steam is fed to the steam turbine 114 and discharged to the waste steam passage 115. An auxiliary circulation passage 128 is connected to the waste steam passage 115 so that the waste steam is circulated to the auxiliary boiler 124 through the auxiliary circulation passage 128. A regulator valve 129, a steam condenser 130 and an auxiliary steam pump 131 are provided along the flow direction at the auxiliary circulation passage 128.

The gas turbine 108 is started only when the auxiliary boiler 124 has already started. In the initial stage, the regulator valve 126 of the auxiliary steam passage 127 is opened, and the cooling auxiliary steam is fed from the auxiliary boiler 124 through the check valve 125 to the high temperature area 123 within the gas turbine 108. The cooled steam is introduced to the steam condenser 130 through the steam turbine 114 and the regulator valve 129 of the auxiliary circulation passage 128 and is returned as water back to the auxiliary boiler 124 by the auxiliary steam condenser pump 131.

The amount of steam generated from the waste heat recovery boiler 112 is small in the initial stage of the starting operation. Accordingly, the regulator valve 119a of one steam passage 113a is closed, and the steam is not used for cooling. The regulator valve 119b of the other steam passage 113b is opened so that the steam is fed to the steam turbine 114 which can sufficiently use such an amount of steam. On the other hand, after passage of a certain period of time during which the amount of steam generated by the waste heat recovery boiler 112 of the main system 122a is increased so that enough steam may be obtained, the regulator valve 119a of the one steam passage 113a is opened and the steam of the waste heat recovery boiler 112 is fed to the gas turbine 108 side to be used as the cooling steam. The auxiliary boiler 124 is stopped after the predetermined amount of steam can be obtained from the waste heat recovery boiler, after passage of a certain period of time from the starting.

During operation thereafter, the high temperature exhaust gas of the gas turbine 108 is fed to the waste heat recovery boiler 112 to generate steam through heat exchange with water. A portion of the generated steam passes through the regulator valve 119a and is used as the cooling steam for cooling the gas turbine stationary blades, and then is fed to the steam turbine 114. On the other hand, another portion of the steam is fed directly to the steam turbine 114 through the regulator valve 119b and expands to generate power. The steam water discharged from the steam turbine 114 is converted into water in the steam condenser 116 and is circulated to the waste heat recovery boiler 112 by the steam condenser pump 117. The gas turbine 104 and the steam turbine 114 drive the power generators 100a and 100b, respectively.

There are two types of operating methods for starting the above-described conventional gas turbine using a steam cooling system. In one operating method, after the air made to flow to the gas turbine high temperature area from the compressor during starting and the high temperature area reaches a suitable temperature for the steam to flow, the valve is switched to allow the steam to flow for regular operation. In the other operating method, during starting, the steam is made to flow from the auxiliary boiler to the high temperature area to initialize the operation, and thereafter the steam from the waste heat recovery boiler is used for regular operation.

Since it is impossible to obtain cooling steam at a suitable temperature in the starting operation of the gas turbine because the waste heat from the gas turbine has a low temperature and the heat capacity of the pipes of the waste heat recovery boiler is limited, there has been a problem in that dew condenses in the steam cooling passages in the gas turbine blades. Consequently, as described above, it has been necessary to use the steam from the auxiliary boiler or air from the compressor when starting the gas turbine so that the steam cooling passages warm up. It has also been necessary to protect the respective steam cooled portions from the combustion gas generated in the gas turbine so that high temperature gas is prevented from entering the steam cooled portions.

The above-described conventional methods attain these objects, but it is necessary to use large scale equipment such as an auxiliary boiler.

SUMMARY OF THE INVENTION

Accordingly, in order to attain the above-noted objects, a recovery type steam cooled gas turbine is provided having equipment that warms up steam cooled portions in a starting operation without using large scale components such as an auxiliary boiler, prevents for draining when feeding the cooling steam, securely prevents penetration of high temperature combustion gas, eliminates the residual steam even during stoppages, and prevents rust caused by condensation of the residual steam.

In view of the above and other objects which will become apparent as the description proceeds, there is provided according to a general aspect of the present invention a recovery type steam cooled gas turbine comprising: a system for recovering waste heat of the gas turbine by means of a waste heat recovery boiler and for driving a steam turbine; and a steam system in which at least a wall surface of a gas turbine combustor, steam cooling passage systems of some moving blades of the gas turbine, steam cooling passage systems of some stationary blades of the gas turbine, a steam cooling passage system of a gas turbine rotor and/or a system combining them is cooled with steam generated in the waste heat recovery boiler and/or steam having suitable pressure and temperature taken from steam that has passed through the steam turbine, and is thereafter recovered to at least one of the waste heat recovery boiler, the steam turbine and a steam condenser, characterized in that said gas turbine further comprises a medium feed system for causing, in a starting operation and/or a stopping operation of the gas turbine, a predetermined medium to flow through said steam cooling passage system and said system combining them while being isolated from the other systems.

When starting a gas turbine, since the waste heat of the gas turbine is still low and also the heat capacity of the waste heat recovery boiler passages is large, it is impossible to obtain a suitable temperature steam even if the steam is made to pass therethrough. Consequently, dew condenses in the steam cooling passages or the high temperature combustion gas is introduced into the steam cooling passage during the starting operation. Accordingly, with a gas turbine according to a general aspect of the present invention, the steam cooling passage system is isolated from the other systems and is connected to the medium feed system using a medium other than steam, air for example, to perform a warming-up operation. This warming-up operation is performed so that the temperature of the steam cooling passages is made to be close to the steam temperature. Then, the valves are switched to connect the steam cooling passage to the steam system to make the steam flow for normal operation.

Thus, such a warming-up operation of the gas turbine is performed when starting the gas turbine to thereby prevent dew from condensing in the steam cooling passages when feeding the steam and prevent an unbalance or vibration of the rotor due to the dew condensation. Also, during the warming-up operation, since the medium is made to flow through the steam cooling passages, it is possible to prevent the high temperature combustion gas from penetrating thereinto.

In a preferred mode for carrying out the invention, when starting the gas turbine, said steam cooling passage system is kept at a pressure higher than that of the combustion gas that passes through an interior of the gas turbine so as to prevent the combustion gas from leaking into the passage system.

In another preferred mode for carrying out the invention, the medium that flows through said steam cooling passage system is steam that is kept at a pressure higher than that of the combustion gas.

Since the pressure of the medium that passes through said steam cooling system is higher than the pressure of the outside combustion gas, it is possible to positively prevent the high temperature gas from penetrating into the steam cooling passage system when starting the gas turbine, and the oxidation and the like of the interior of the passages by such gas can be prevented.

In yet another preferred mode for carrying out the present invention, a compressor and a temperature adjuster for the predetermined medium are provided in said medium feed system.

Since the compressor and the temperature adjuster are provided in the medium feed system, the medium is pressurized thereby making it easy to circulate the medium. Also, a suitable temperature adjustment can always be performed so that the temperature of the medium is suitable for the warming-up operation.

In still another preferred mode for carrying out the invention, said medium feed system changes the temperature of the predetermined medium between an initial stage and a later stage of the starting operation of the gas turbine, and the temperature of the predetermined medium in the later stage is higher than the temperature of the predetermined medium in the initial stage.

In the initial stage of the starting operation, since the moving blades of the gas turbine are at a low temperature in the range of from room temperature to about 300° C., the warming-up operation is performed so that the temperature of the medium matches this temperature. In the later stage of the starting operation, the temperature of the gas turbine moving blades is high, in the range of about 300 to 500° C. Accordingly, the temperature of the medium is also increased to match this change. As a result, since the warming-up operation is performed while keeping the temperature of the medium in conformity with the temperature elevation of the moving blades, the temperature difference between the moving blades and the medium is eliminated, and there is not only no dew condensation in the starting operation, but also none during the feeding of the steam so it is possible to positively prevent vibrations or unbalanced rotation due to the dew condensation.

In still another preferred mode for carrying out the invention, the medium is air extracted from the compressor or an outlet air thereof.

Since the air is extracted from the compressor as the medium, the system for the medium may be simplified, and the adjustment of the temperature and the pressure may be readily performed.

In still another preferred mode for carrying out the invention, the medium is inert gas.

Since an inert gas other than that outside of the gas turbine system may be used as the medium, the range of the medium available for the warming-up operation in the starting operation of the gas turbine may be expanded.

In still another preferred mode for carrying out the invention, said medium feed system makes dry air to flow through said steam cooling passages during the stopping operation of the gas turbine and purges residual steam within said steam cooling passages to make it possible to discharge the residual steam to the outside.

In the stopping operation of the gas turbine, the steam remains in the steam cooling passages, and this residual steam condenses to generate rust or the like. However, by virtue of the structure described above, the dry air is passed through the steam cooling passages in the stopping operation and the residual steam is purged. Accordingly, it is possible to positively prevent the generation of the drain caused by the residual steam at all the times after the stopping operation.

According to an another aspect of the present invention, a recovery type steam cooled gas turbine in which a steam turbine is driven by the waste heat of the gas turbine, a portion of the steam is extracted from a steam system of the steam turbine and is introduced into and used to cool steam cooling passages kept at a high temperature in the gas turbine, and the steam after cooling is returned to and recovered by the steam system of the steam turbine, characterized in that said gas turbine further comprises a medium feed system for feeding a medium other than steam to said steam cooling passages by connecting inlet and outlet sides of the steam cooling passages in a starting operation and/or a stopping operation of the gas turbine.

The medium feed system that may be switched by the valves or the like is connected to the inlet and outlet sides of the cooling steam system to cause the medium other than steam, for example, air to flow for-the warming-up operation. This warming-up operation is performed so that the temperature of the steam cooling passages is made to be close to the steam temperature. Thereafter, the valves are switched to connect the steam cooling passage to the steam system to make the steam flow for regular operation.

Thus, such warming-up operation of the gas turbine is performed in the starting operation the gas turbine to prevent dew from condensing in the steam cooling passages when feeding the steam and to prevent unbalances or vibrations in the rotor due to the dew condensation. Also, during the warming-up operation, since the medium flows through the steam cooling passages, it is possible to prevent high temperature combustion gas from penetrating thereinto.

BRIEF DESCRIPTION OF THE DRAWINGS

In the course of the description which follows, reference is made to the drawings, in which.

DETAILED DESCRIPTION OF THE PREFERRED EMBODIMENTS

Figure 1:
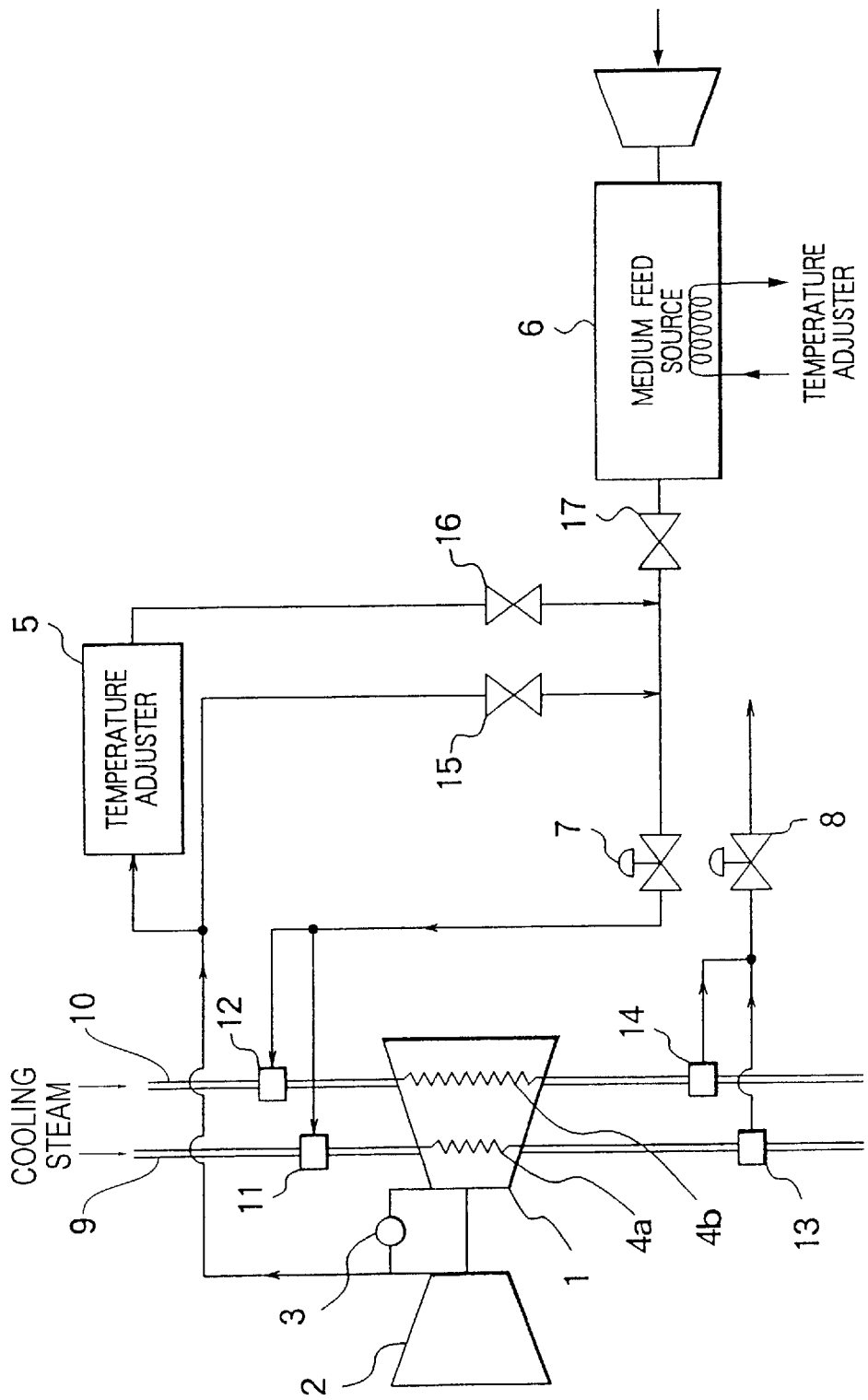
FIG. 1 is a schematic view showing a recovery type steam cooled gas turbine in accordance with a first embodiment of the present invention.

The present invention will be described in detail in conjunction with what are presently considered as preferred or typical embodiments thereof with reference to the drawings.

In the following description, like reference numerals designate like or corresponding elements throughout the several views. Also, in the following description, it is to be understood that such terms as "left", "right", "top" and "bottom" and the like are words of convenience and are not to be construed as limiting terms.

Embodiment 1

FIG. 1 is a schematic view showing a recovery type steam cooled gas turbine in accordance with a first embodiment of the present invention. In FIG. 1, reference numeral 1 denotes a gas turbine in which a moving blade steam cooling passage 4a and a stationary blade steam cooling passage 4b are included. Numeral 2 denotes a compressor and numeral 3 denotes a combustor. Numeral 5 denotes a temperature adjuster which is composed of a cooler or the like for adjusting the temperature of air extracted from the compressor 2. Numeral 6 denotes a medium feed source for feeding an inert gas such as air or $N_2$. In the case of air, the air is fed from an air feed source other than the compressor 2.

Numerals 7 and 8 denote flow rate regulator valves which are provided on the feed side and the discharge side of a cooling medium, respectively. Numerals 9 and 10 are steam cooling pipes which are communicated with the moving blade steam cooling passage 4a and the stationary blade steam cooling passage 4b for introducing the steam generated in the waste heat recovery boiler or the steam having a suitable pressure and a suitable temperature from the steam passing through the steam turbine and recovering the steam after cooling at the waste heat recovery boiler (not shown).

Numerals 11 and 12 denote three-way valves provided on the inlet flow side of the moving and stationary blade steam cooling pipes 9 and 10, respectively. Numerals 13 and 14 also denote three-way valves on the outlet flow side of the moving and stationary blade steam cooling pipes 9 and 10, respectively. Numerals 15, 16 and 17 denote valves for turning the feeding of the medium on and off. The valves 15 and 16 control the air from compressor 2 and the valve 17 controls the flow of the cooling medium from the medium feed source 6.

In the first embodiment with such an arrangement, in the starting operation of the gas turbine, the steam inlet and outlet sides of the three-way valves 11, 12, 13 and 14 are closed, respectively, and subsequently, the valves 15 and 16 are opened and the valve 17 is closed whereby the air from the compressor 2 is communicated with the gas turbine 1. Then, the air from the compressor 2 is introduced into the moving and stationary steam cooling passages 4a and 4b through the three-way valves 11 and 12 by adjustment of the flow rate regulator 7. The air that flows out of the moving and stationary steam cooling passages 4a and 4b through the three-way valves 13 and 14, passes through the flow rate regulator valve 8 to the outside of the system. Thus, the air from the compressor 2 flows for a predetermined period of time. In this case, the temperature of the air is adjusted by the temperature adjuster 5 for the warming-up operation so that the temperature is gradually elevated to be close to the steam temperature in the regular operation.

On the other hand, when the warming-up operation is performed with the medium feed source 6 using the medium from the outside, in the same way, the steam inlet and outlet sides of the three-way valves 11, 12, 13 and 14 are closed, respectively, and the valves 15 and 16 are closed and only the valve 17 is opened. The outside air from the medium feed source 6 or the inert gas such as $N_2$ flows into the moving and stationary blade steam cooling passages 4a and 4b through the flow rate regulator 7 and the three-way valves 11 and 12, and thereafter flows out through the three-way valves 13 and 14 and the flow rate regulator valve 8. The air or the like from the medium feed source 6 flows into the moving and stationary blade steam cooling passages for a predetermined period of time to warm them up.

The inlet pressure of the air from the compressor 2, the outside air or the inert gas from the medium feed source 6 for flowing through the moving and stationary blades is set to be higher than the pressure of the combustion gas to be passed through the gas turbine 1 so that, in the starting operation of the gas turbine, the high temperature combustion gas is prevented from entering the moving and stationary blade steam cooling passages 4a and 4b.

The temperature of the air or the inert gas to be introduced is adjusted in the range of from room temperature to 300° C. to match the low temperature (room temperature to 300° C.) of the moving blades of the gas turbine in the initial stage of the starting operation. Also, in the later stage of the starting operation, since the turbine moving blades are kept at a high temperature (300 to 500° C.), the temperature of the air or inert gas is adjusted to be in the range of from 300° C. to 500° C. to match their temperature.

In the starting operation of the gas turbine, when the air or inert gas having a pressure and temperature under the above-described condition is allowed to flow through the moving and stationary blade steam cooling passages 4a and 4b of the gas turbine for a predetermined period of time so that the temperature of the moving and stationary blade steam cooling passages 4a and 4b of the gas turbine becomes close to the steam temperature in the regular operation, the three-way valves 11, 12, 13 and 14 are switched to close the passages for warming up and the inlet side and the outlet side of the steam cooling pipes 9 and 10 are communicated, respectively, to allow the steam to flow to perform the steam cooling for the regular operation.

Thus, the warming-up operation of the gas turbine is performed to thereby prevent dew condensation in a cold start of the gas turbine plant and to prevent the generation of an unbalance or vibration in the rotor due to the dew condensation. Also, it is possible to prevent the oxidization or corrosion of the moving and stationary blades of the gas turbine.

As described above, in the starting operation of the gas turbine, the moving and stationary blade steam cooling passages 4a and 4b of the gas turbine are warmed up, and thereafter, normal operation is performed. In stopping the gas turbine, the steam remaining in the moving and stationary blade steam cooling passages 4a and 4b is purged as described below, to prevent condensation caused by the residual steam after the stopping operation.

Namely, in the same manner as in the warming-up operation, the three-way valves 11 to 14 are switched to close the steam inlet side and the steam outlet side of the steam cooling pipes 9 and 10. Subsequently, in the same manner as in the warming-up operation, dry air is made to flow into the moving and stationary blade steam cooling passages 4a and 4b through the three-way valves 11 and 12 for a predetermined period of time and to flow out through the three-way valves 13 and 14 and the flow rate regulator valve 8. Thus, the steam remaining in the moving and stationary blade steam cooling passages 4a and 4b is discharged to the outside. After the residual steam within the moving and stationary blade steam cooling passages 4a and 4b is purged, the three-way valves are returned to their original positions so that the inlet side and outlet side of the steam cooling pipes 9 and 10 are communicated to close the passages on the warming-up side.

Further, although not shown, when the steam cooling is effected at the wall surface of the combustor 3 in the same manner, the air is made to flow to purge the residual steam after the stopping operation of the gas turbine in the same manner as with the moving and stationary blade steam cooling passages 4a and 4b so that the condensation of the steam after the stopping operation is prevented.

Embodiment 2

Figure 2:
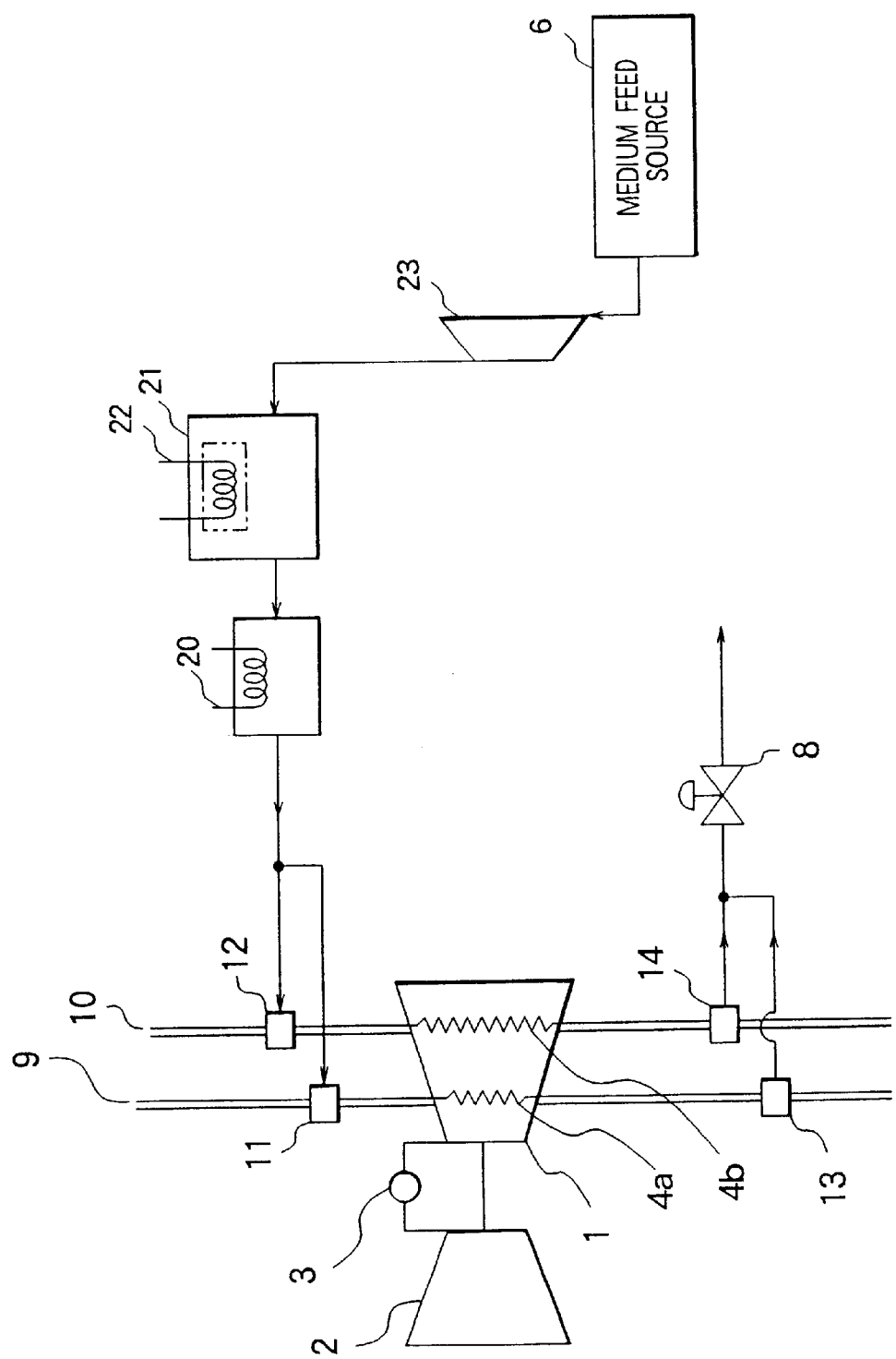
FIG. 2 is a schematic view showing a recovery type steam cooled gas turbine in accordance with a second embodiment of the present invention.

FIG. 2 is a schematic view of a recovery type steam cooled gas turbine in accordance with a second embodiment of the present invention. In FIG. 2, the difference from the first embodiment is that the air extracting system from the compressor 2 is dispensed with and only the medium feeding is effected from the medium feed source 6. Consequently, a heater 20, an accumulator 21 provided with a heater 22 and a discrete miniaturized compressor 23 are provided in the medium feed system. The other structures are the same as those of the first embodiment.

In the second embodiment with such an arrangement, in starting the gas turbine, the three-way valves 11 to 14 are switched to close the steam inlet and outlet sides of the steam cooling pipes 9 and 10. Then, the medium feed source 6 and the moving and stationary blade steam cooling passages 4a and 4b are communicated with each other, respectively. The pressure of the air or inert gas such as $N_2$ from the medium feed source 6 is increased to a predetermined pressure level by the compressor 23. Then the air or inert gas is made to flow into the accumulator 21.

The air from the compressor or the like flows into the accumulator 21 until the internal pressure of the accumulator 21 is sufficiently increased, and is heated by the heater 22, if necessary, to maintain a required temperature. Although a small amount of the medium may leak along the feed passage or at the feed port to the interior of the blades, the recovery port therefrom or the like in the moving and stationary blade steam cooling passages 4a and 4b of the gas turbine, even if a large amount of the medium should leak, provision of the accumulator 21 effectively keeps the pressure of the medium within the feed passages high.

The medium from the accumulator 21 is subjected to temperature adjustment by the heater 20, is introduced into the moving and stationary blade steam cooling passages 4a and 4b through the three-way valves 11 and 12, and is discharged through the flow rate regulator 8 and the three-way valves 13 and 14. The medium flows through the moving and stationary blade steam cooling passages 4a and 4b for a predetermined period of time to warm them up. The pressure and temperature conditions and the adjustment of the warming medium are the same as those of the first embodiment so their detailed explanation will be omitted here.

After completion of the warming-up operation, the temperature within the steam cooling passages 4a and 4b is close to the cooling steam temperature. Accordingly, the three-way valves 11 to 14 are switched to allow the steam to flow into the moving and stationary blade steam cooling passages 4a and 4b from the steam cooling pipes 9 and 10 to perform the cooling operation for the regular operation. Also, after the stopping operation of the gas turbine, the residual steam is purged in the same manner as in the first embodiment. Accordingly, in this embodiment, it is possible to ensure the same effect as that of the first embodiment.

Embodiment 3

Figure 3:
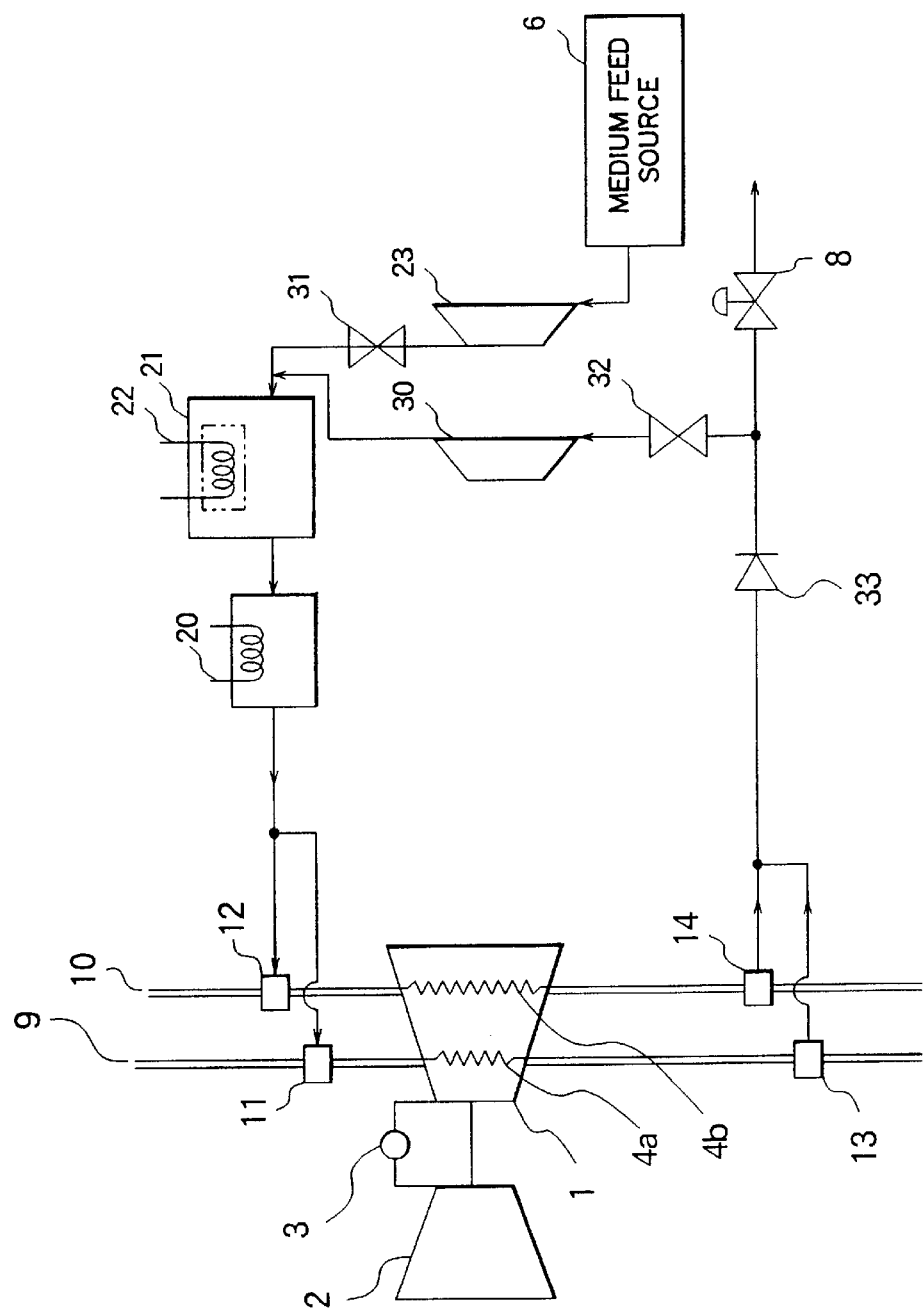
FIG. 3 is a schematic view showing a recovery type steam cooled gas turbine in accordance with a third embodiment of the present invention.

FIG. 3 is a schematic view of a recovery type steam cooled gas turbine in accordance with a third embodiment of the present invention. In FIG. 3, the difference from the second embodiment is that a discrete miniaturized compressor 30 for circulation, valves 31 and 32, and a check valve 33 are provided in addition to the medium feed system so that the medium may be further circulated from the medium feed source 6.

In the third embodiment with such an arrangement, firstly, the steam inlet and outlet sides of the three-way valves 11 to 14 are closed and the valve 32 is closed. The air or inert gas introduced through the compressor 23, the valve 31 and the accumulator 21 from the medium feed source 6 is discharged for a time to the outside through the flow rate regulator 8. Thereafter, the valve 31 is closed and the valve 32 is opened so that the medium, pressurized by the compressor 30, is circulated through the moving and stationary steam cooling passages 4a and 4b. The medium is heated by the heater 20 while being circulated. Thus, temperature adjustment is effected to accelerate convection due to the circulation and to perform the warming-up operation.

The pressure and temperature conditions of the warming-up operation are the same as those of the first or second embodiment, and the purging of the residual steam after the stopping operation of the gas turbine is the same as that of the first or second embodiment. Hence, the explanations thereof will be omitted here.

Embodiment 4

Figure 4:
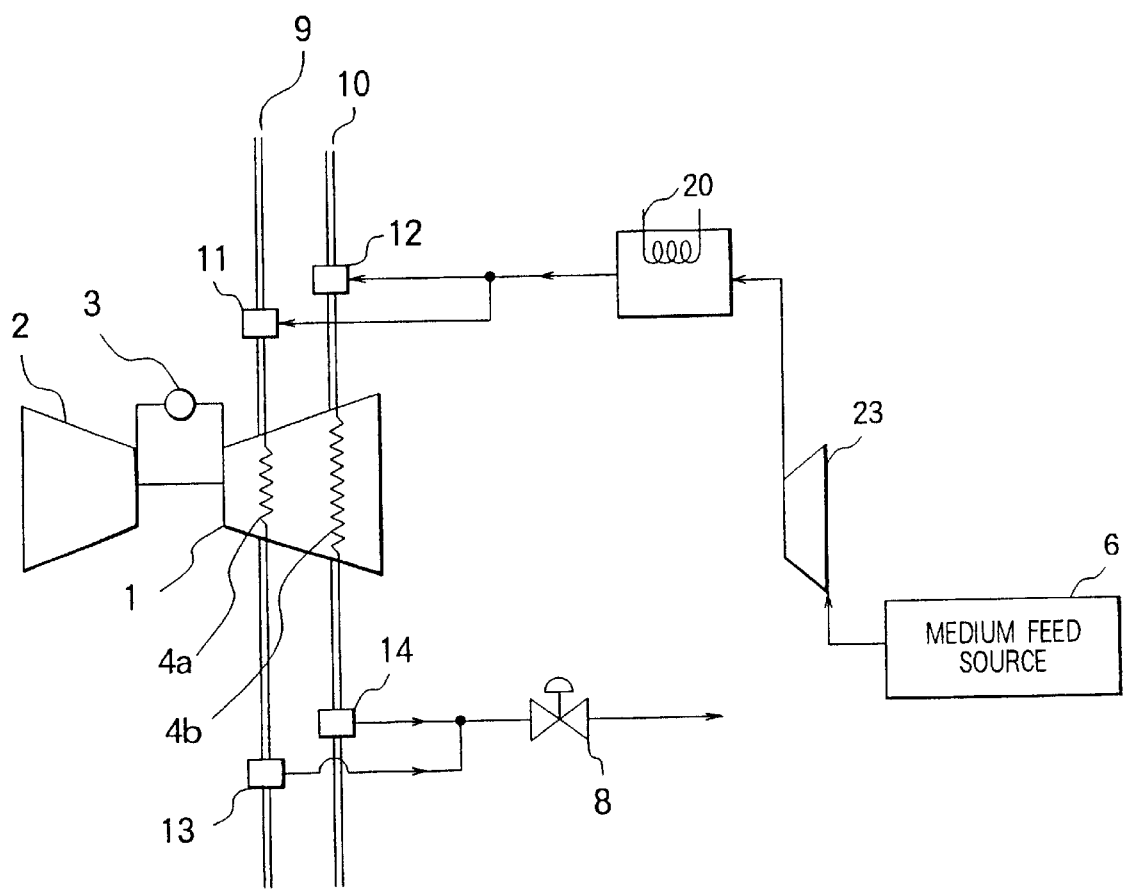
FIG. 4 is a schematic view showing a recovery type steam cooled gas turbine in accordance with a fourth embodiment of the present invention.

FIG. 4 is a schematic view of a recovery type steam cooled gas turbine in accordance with a fourth embodiment of the present invention. In FIG. 4, the difference from the second embodiment shown in FIG. 2 is that the accumulator 21 and the heater 22 are dispensed with.

Accordingly, although the accumulator 21 is provided in the structure shown in FIG. 2 when the amount of steam leaked is large so as to ensure high pressure, the arrangement shown in FIG. 4 is used when the amount of steam leaked is small and the necessary pressure may be sufficiently maintained.

Embodiment 5

Figure 5:
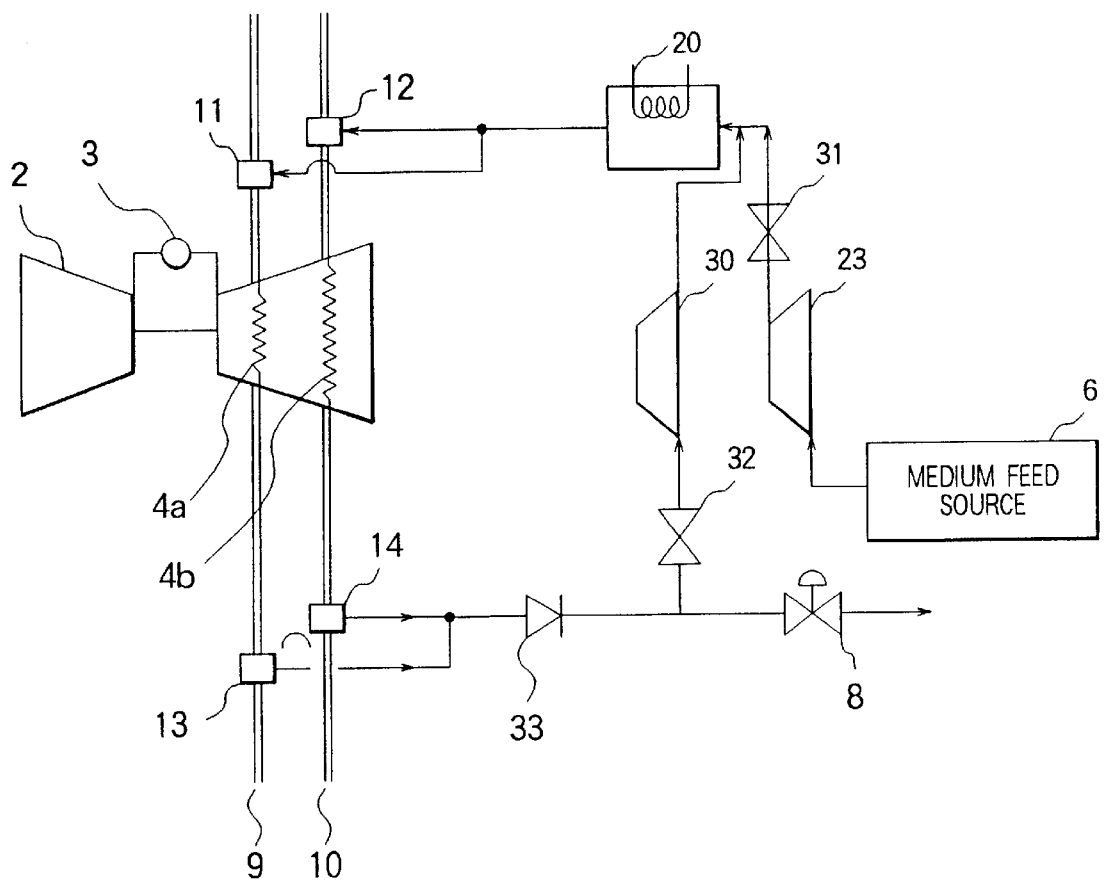
FIG. 5 is a schematic view showing a recovery type steam cooled gas turbine in accordance with a fifth embodiment of the present invention.

FIG. 5 is a schematic view of a recovery type steam cooled gas turbine in accordance with a fifth embodiment of the present invention. In FIG. 5, the difference from the fourth embodiment shown in FIG. 4 is that a discrete miniaturized compressor 30, valves 31 and 32 and a check valve 33 are provided to supplement the medium circulation system.

Accordingly, in the same manner as in the structure in accordance with the fourth embodiment shown in FIG. 4, although the accumulator 21 is provided in the structure shown in FIG. 2 when the amount of steam leaked is large so as to ensure high pressure, the arrangement shown in FIG. 5 is used when the amount of steam leaked is small and the necessary pressure may be sufficiently maintained.

Embodiment 6

Figure 6:
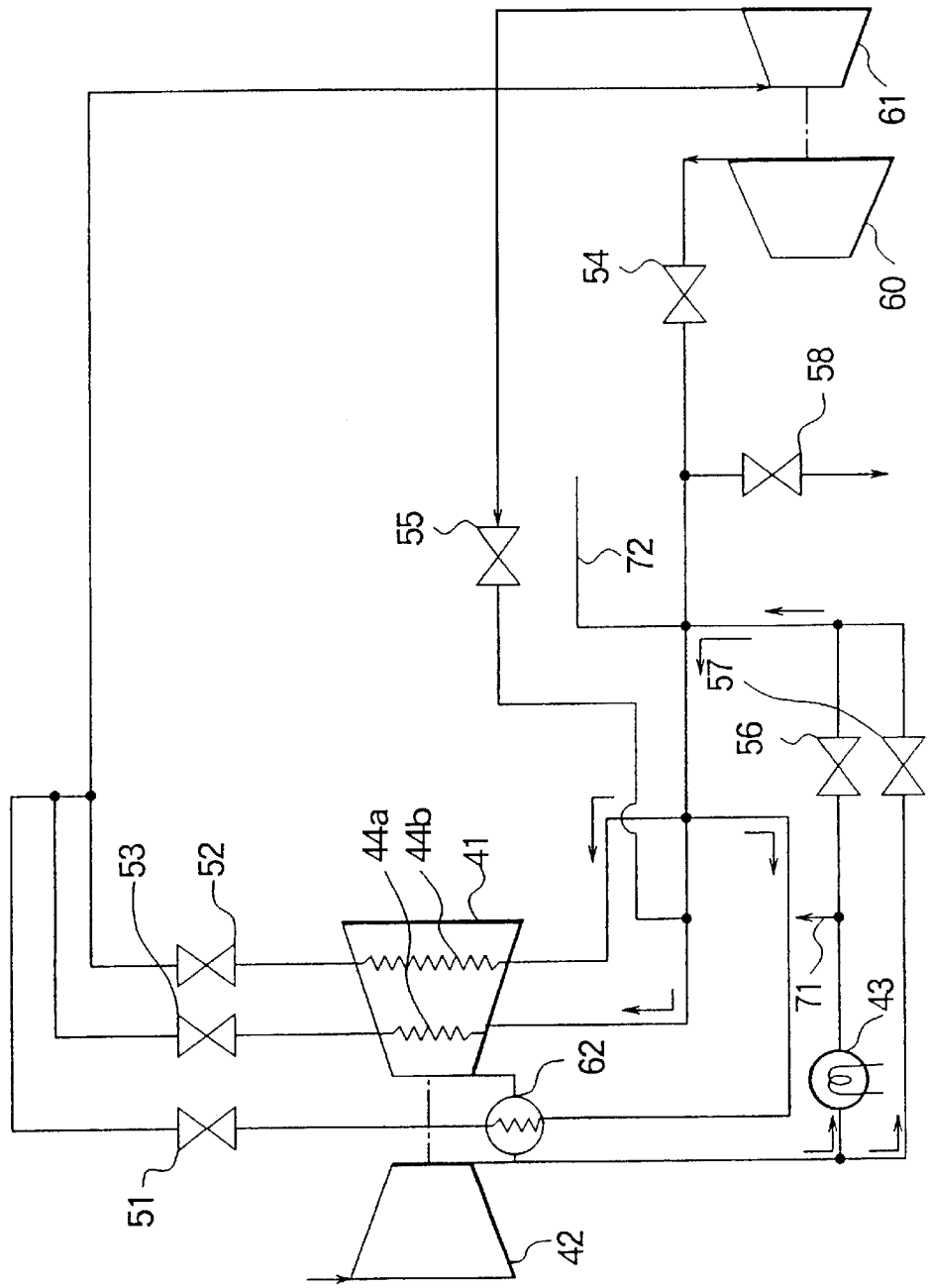
FIG. 6 is a schematic view showing a recovery type steam cooled gas turbine in accordance with a sixth embodiment of the present invention.
Figure 7:
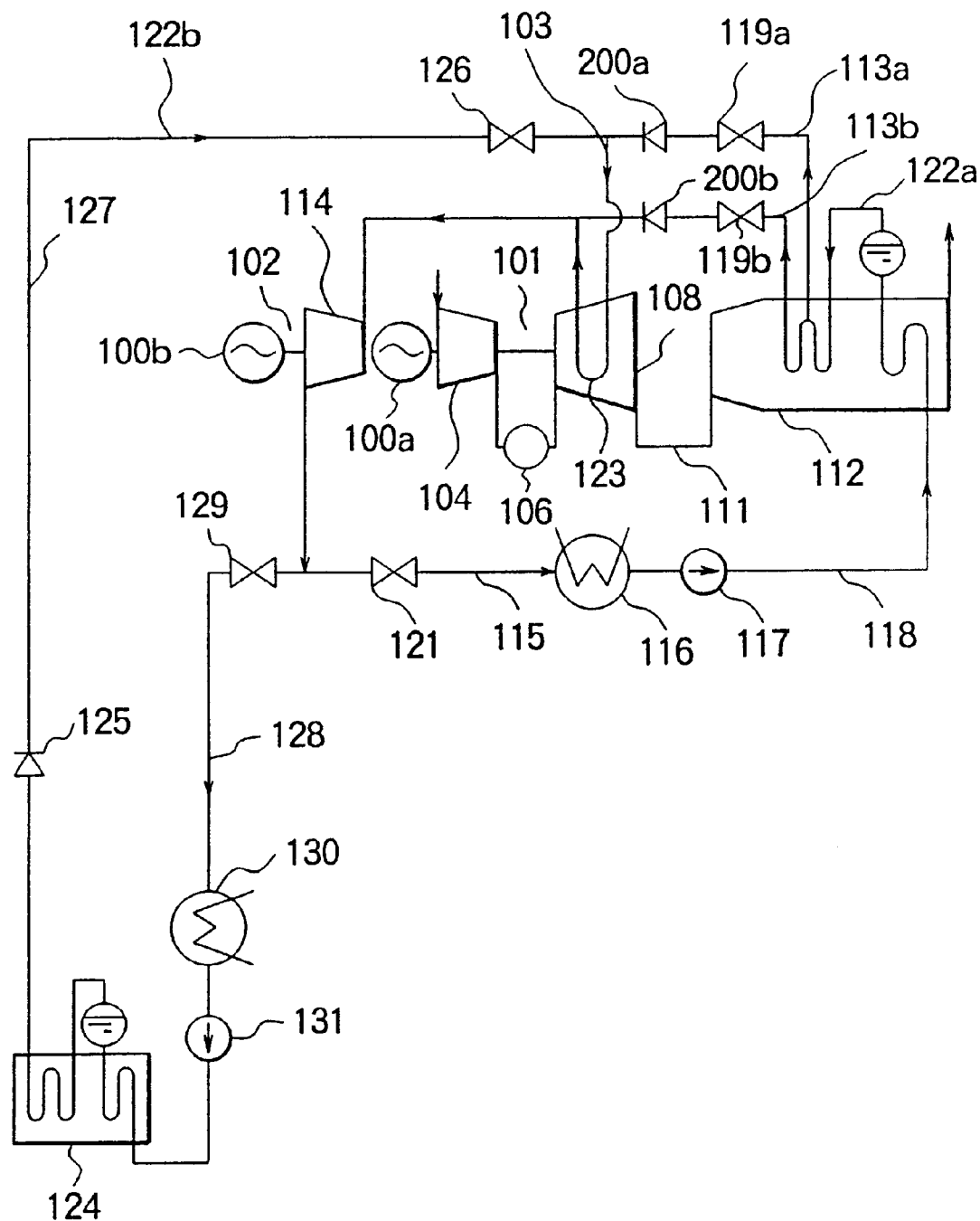
FIG. 7 is a schematic view showing a composite power generation plant using a conventional steam cooling system.
Figure 8:
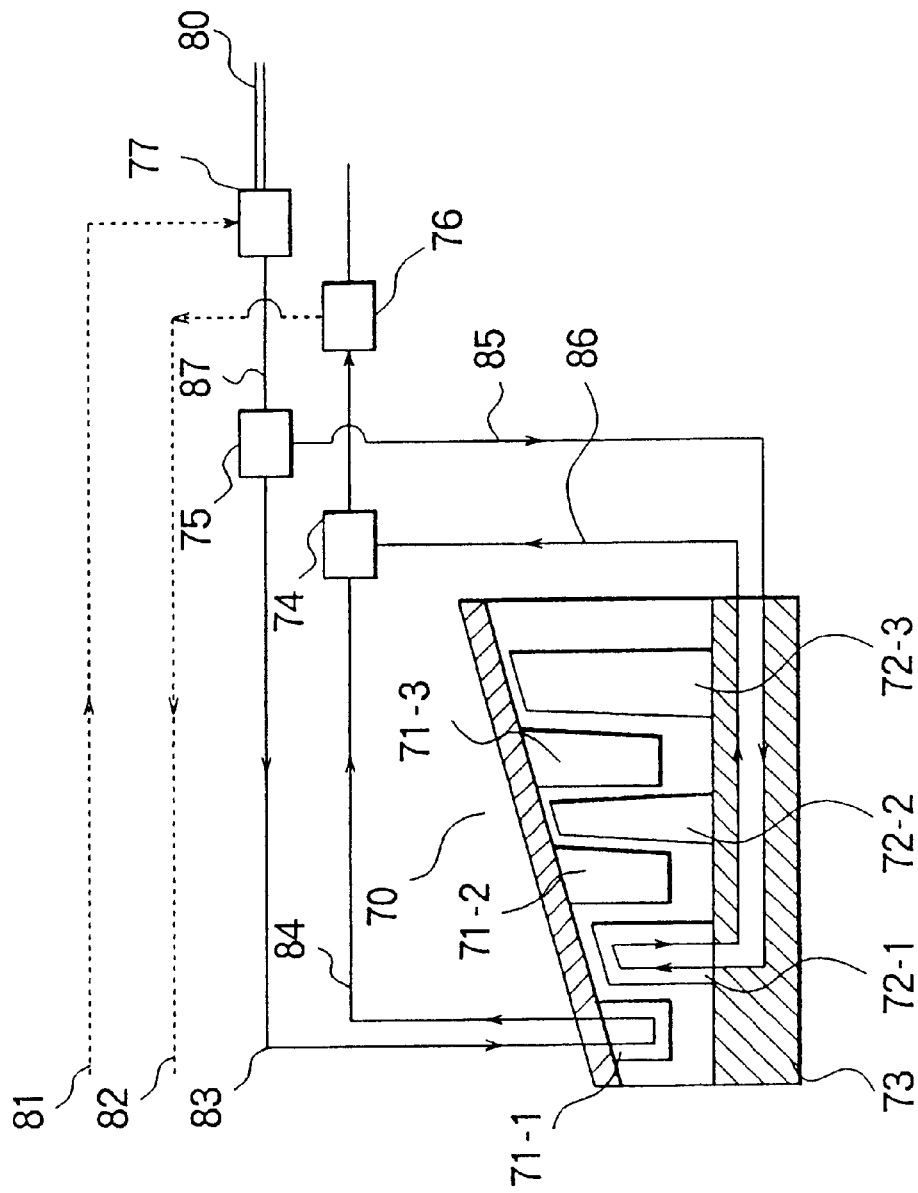
FIG. 8 is a schematic view showing another example of the conventional steam cooled gas turbine.

FIG. 6 is a schematic view of the starting operation of a recovery type steam cooled gas turbine in accordance with a sixth embodiment of the present invention. In FIG. 6, in a steam cooled type gas turbine, the warming-up operation is performed with air when starting the gas turbine. Thereafter, the cooling steam is fed for the regular operation.

In FIG. 6, numeral 41 denotes a gas turbine, numeral 42 denotes a compressor, and numeral 43 denotes a cooler for cooling the air from the compressor. Numeral 44a denotes a moving blade steam cooling passage and numeral 44b denotes a stationary blade steam cooling passage. Numeral 51 denotes a tail sleeve steam control valve. Numerals 52 and 53 denote moving and stationary blade steam control valves, respectively. Numeral 54 denotes a steam stop valve from a high pressure turbine 60. Numeral 55 denotes a steam stop valve from an intermediate pressure turbine 61. Numeral 56 denotes a moving blade cooling air feed valve. Numeral 57 denotes an air feed valve. Numeral 58 denotes a steam feed valve to a high pressure super heater. Numeral 62 denotes a combustor. Numeral 71 is a pipe to an intermediate shaft. Numeral 72 denotes a pipe to an external boiler.

In such a recovery type steam cooled gas turbine, during a cold start, the valves 51, 52, 53, 54, 55, 57 and 58 are fully closed and the moving blade cooling air feed valve 56 is opened. Then, the cooler 43 is operated to feed the cooling air to the moving and stationary steam cooling passages 44a and 44b to cool the moving blades. The air is also fed to the combustor 62 if necessary. After the rated speed has been reached, the valve 56 is closed and the air feeding valve 57 is opened. Thus, the air which has not been passed through the cooler 43 is introduced for one hour to perform the warming operation for the a disc until a temperature of about 200° C. is reached. At the same time, the valve 58 is opened to heat the high pressure super heater.

Thus, after the warming-up operation has been performed with the cooling air, the valves 52, 53 and 54 are opened and the valves 56 and 57 are closed. Then, the steam from the high pressure turbine 60 is fed to the moving and stationary steam cooling passages 44a and 44b and the combustor 62. The steam is recovered at the intermediate turbine 61 for the regular operation.

Also, in the above-described embodiments 1 to 5, in the starting operation of the gas turbine, the air from the compressor 2 or the air or inert gas from the medium feed source 6 is kept at a pressure higher than the combustion gas pressure and is made to flow through the moving and stationary blade steam cooling passages 4a and 4b to perform the warming up operation. Thereafter, the steam is made to flow for the regular steam cooling. Accordingly, dew condensation is eliminated when feeding the steam. At the same time, the high temperature combustion gas is prevented from being introduced into the moving and stationary steam cooling passages 4a and 4b.

Furthermore, after stopping operation of the gas turbine, air is made to flow through the moving and stationary blade steam cooling passages 4a and 4b so that the residual steam may be purged. Accordingly, it is possible to prevent rust caused by condensation of the residual steam after the stopping operation.

Various details may be changed without departing from the spirit or scope of the invention. Furthermore, the foregoing description of the embodiments according to the present invention are provided for the purpose of illustration only, and are not meant to limit the invention as defined by the appended claims and their equivalents.

What is claimed is:

1. A recovery type steam cooled gas turbine comprising:
    a gas turbine system having (1) a compressor, (2) a combustor, and (3) a gas turbine with a rotor, moving blades, and stationary blades;
    a recovery system for recovering waste heat of the gas turbine via a waste heat recovery boiler and for driving a steam turbine;
    a steam system for delivering a cooling steam from the recovery system to a passage system including (1) a passage through the combustor, (2) passages through some of the moving blades, (3) passages through some of the stationary blades, and (4) a passage through the rotor;
    medium feed means for feeding a medium through at least a portion of the passage system, while the portion is isolated from the steam system during at least one of (1) a starting operation of the gas turbine to warm the portion of the passage system, and (2) a stopping operation of the gas turbine to purge steam from the portion of the passage system; and
    a temperature adjuster that is operative during the starting operation to adjust a temperature of air flowing from the compressor to the portion of the passage system to conform with a temperature elevation of the moving blades.

2. The recovery type steam cooled gas turbine according to claim 1, wherein during the starting operation of the gas turbine, the portion of the passage system is maintained at a pressure that is higher than that of a combustion gas that passes through an interior of the gas turbine so as to prevent the combustion gas from leaking into the portion of the passage system.

3. The recovery type steam cooled gas turbine according to claim 1, wherein the medium feed means comprises:
    a compressor; and
    a temperature adjuster for the medium.

4. The recovery type steam cooled gas turbine according to claim 3, wherein the medium feed means changes a temperature of the medium between an initial stage and a later stage of the starting operation of the gas turbine, and the temperature of the medium in the later stage is higher than the temperature of the medium in the initial stage.

5. The recovery type steam cooled gas turbine according to claim 1, wherein the medium is air.

6. The recovery type steam cooled gas turbine according to claim 1, wherein the medium is an inert gas.

7. The recovery type steam cooled gas turbine according to claim 1, wherein the medium feed means flows dry air through the portion of the passage system during the stopping operation of the gas turbine.

8. The recovery type steam cooled gas turbine according to claim 3, wherein the medium feed means changes a temperature of the medium during the starting operation of the gas turbine so that the temperature of the medium is gradually elevated.

* * * * *